(12) United States Patent
Disley et al.

(10) Patent No.: US 10,006,239 B2
(45) Date of Patent: Jun. 26, 2018

(54) ARRANGEMENT AND A METHOD FOR OPERATING VEHICLE WINDOWS

(71) Applicant: VOLVO CAR CORPORATION, Gothenburg (SE)

(72) Inventors: Jonathan Disley, Asa (SE); Niklas Palm, Gothenburg (SE); Mikael Gordh, Ytterby (SE); Patrik Lundgren, Torslanda (SE); Conny Blomme, Ljungkile (SE)

(73) Assignee: Volvo Car Corporation, Gothenburg (SE)

( * ) Notice: Subject to any disclaimer, the term of this patent is extended or adjusted under 35 U.S.C. 154(b) by 1 day.

(21) Appl. No.: 15/133,559

(22) Filed: Apr. 20, 2016

(65) Prior Publication Data

US 2016/0305178 A1 Oct. 20, 2016

(30) Foreign Application Priority Data

Apr. 20, 2015 (EP) .................................. 15164232

(51) Int. Cl.
*E05F 15/60* (2015.01)
*B60J 1/17* (2006.01)
*E05F 15/74* (2015.01)
*E05F 15/695* (2015.01)
*E05F 15/73* (2015.01)

(52) U.S. Cl.
CPC ................. *E05F 15/60* (2015.01); *B60J 1/17* (2013.01); *E05F 15/74* (2015.01); *E05F 15/695* (2015.01);
(Continued)

(58) Field of Classification Search
CPC ......... E05F 15/695; E05F 15/40; E05F 15/41; E05Y 2900/55; E05Y 2400/86;
(Continued)

(56) References Cited

U.S. PATENT DOCUMENTS

| 8,095,278 B2 * | 1/2012 | Schaaf .................. B60K 35/00 297/61 |
| 2003/0090152 A1 * | 5/2003 | Juntunen ............. B60R 16/0315 307/10.1 |

(Continued)

OTHER PUBLICATIONS

Extended European Search Report for European Application No. EP 15164232.9, Completed by the European Patent Office, dated Oct. 30, 2015, 6 Pages.

*Primary Examiner* — Anne M Antonucci
*Assistant Examiner* — Sanjeev Malhotra
(74) *Attorney, Agent, or Firm* — Brooks Kushman P.C.

(57) ABSTRACT

A window control arrangement for operating two or more windows in a vehicle includes one or several manually operated window control switches set as default to be associated with a specific one of the windows, a window actuator associated with each of the windows and configured for raising or lowering a corresponding window, a control unit connected to the window actuators for controlling raising or lowering of the windows, and an input device connected to the control unit, the input device having a multitude of input modes of which at least one mode is configured for receiving input concerning operation of the windows. The arrangement is configured for activating the input device to be in the at least one mode configured for receiving input concerning operation of the windows as a result of a detected intention from a driver or passenger in the vehicle to activate a window actuator.

19 Claims, 1 Drawing Sheet

(52) U.S. Cl.
CPC ......... *E05F 15/73* (2015.01); *E05F 2015/765* (2015.01); *E05Y 2400/30* (2013.01); *E05Y 2400/42* (2013.01); *E05Y 2400/85* (2013.01); *E05Y 2400/852* (2013.01); *E05Y 2400/858* (2013.01); *E05Y 2900/55* (2013.01)

(58) Field of Classification Search
CPC ........... E05Y 2400/42; E05Y 2400/854; E05Y 2400/336; E05Y 2800/426; B60K 37/06; B60R 16/0315; H01H 2003/0293; H01H 2300/01
USPC ........... 701/49; 307/9.1, 10.1, 101; 318/101, 318/466; 388/809; 340/5.7, 5.72; 49/26, 49/349, 502; 297/61
See application file for complete search history.

(56) References Cited

U.S. PATENT DOCUMENTS

| | | | |
|---|---|---|---|
| 2004/0160202 A1* | 8/2004 | Sugiura | E05F 15/40 318/101 |
| 2007/0040526 A1* | 2/2007 | Goff | H01H 3/04 318/466 |
| 2007/0085423 A1* | 4/2007 | Chin | B60K 37/06 307/101 |
| 2007/0102998 A1* | 5/2007 | Jordan | B60R 16/0315 307/9.1 |
| 2009/0162038 A1* | 6/2009 | Tategami | E05F 15/40 388/809 |
| 2010/0007463 A1* | 1/2010 | Dingman | B60Q 1/2669 340/5.72 |
| 2010/0070143 A1* | 3/2010 | Schmitt | E05F 15/40 701/49 |
| 2010/0199571 A1* | 8/2010 | Bush | B60R 13/02 49/502 |
| 2011/0192087 A1* | 8/2011 | Tategami | G01D 5/2033 49/349 |
| 2014/0176300 A1* | 6/2014 | McIntyre | E05F 15/695 340/5.7 |
| 2015/0019083 A1* | 1/2015 | Kalliomaki | E05F 15/695 701/49 |
| 2015/0372480 A1* | 12/2015 | Nagahama | H02H 7/0851 49/26 |

* cited by examiner

ARRANGEMENT AND A METHOD FOR OPERATING VEHICLE WINDOWS

CROSS-REFERENCE TO RELATED APPLICATIONS

This application claims foreign priority benefits under 35 U.S.C. § 119(a)-(d) to European patent application number EP 15164232.9, filed Apr. 20, 2015, which is incorporated by reference in its entirety.

TECHNICAL FIELD

The disclosure relates to an arrangement and a method for operating vehicle windows, e.g. for raising or lowering the windows. The disclosure can be used in any kind of vehicle, e.g. a car, bus or a heavy transport vehicle.

BACKGROUND

In the automotive industry, there is generally a need for simple, quick and cost-effective methods and arrangements for assembly of vehicles and vehicle parts. In addition, an ever increasing desire for further features and enhanced comfort in a vehicle may lead to problems with fitting all the new features into the vehicle as well as control levers for these features. For example, with regard to an arrangement for operating the windows of a vehicle, there is often an arrangement of multiple control switches in the vicinity of the driver in order to be able to control the raising and lowering of all operable windows in the vehicle from the driver's seat.

A space which is generally considered as suitable for placing the control switches has been the door panel. There may however be a packaging problem due to the size of the window switch pack on the driver's side and the ergonomic demands as well as the cost.

The large window switch pack has always been a difficult part to make room for. There are also very specific demands as to where it can be placed, often in direct conflict with a grab handle, door pockets and the required space for a glove box. In addition, there is a need to provide a mirrored component in order to be used in a Right Hand Drive (RHD) vehicle as well as a Left Hand Drive (LHD) vehicle. Hence, the vehicle either needs to be provided with different constructional components in order to be adapted for different vehicle variants (RHD or LHD) or needs to be equipped with the same set up for both the passenger and driver sides, which may require unnecessary details, e.g. larger panels to be provided on both sides, which thus may increase costs. Today's solutions which are offered by a number of suppliers are often expensive, have a weight penalty and are difficult to package. They may restrict ergonomics and require that the passenger and driver doors are symmetrical around the part in question, creating a large unused area when there is no switch pack on the passenger door.

In recent years, it has become more common with multi-control functions including a central multi-input device from which a multitude of functions in the vehicle may be set or controlled. In the document US 2007/0085423, there is disclosed a vehicle window control arrangement wherein a multi-control switch module is designed in the form of a touch screen for controlling the windows and other features, e.g. a door locking operation and/or vehicle mirrors. Also, the document U.S. Pat. No. 8,095,278 (see FIG. 9) discloses a window control arrangement which includes a multifunctional control unit including control of the vehicle windows.

However, even though these arrangements enable a way to control vehicle windows while reducing the number of hardware control switches for the windows there is still a desire to also be able to use hardware control switches for the windows, e.g. due to legal restrictions or a desire to be able to control the rear windows from the back seat.

There is thus a desire to provide an improved arrangement and method for vehicle window operation which provides a reliable and cost-efficient window operation switch arrangement. Such a solution may reduce the need for different and highly specific hardware control arrangements, e.g. advanced hardware control switches or control units, and may also reduce the variety of components to be used in order to provide a more cost-efficient and easily mountable arrangement while still allowing the windows to be controlled appropriately from relevant positions within the vehicle.

SUMMARY

Consequently, an object of the disclosure is to provide an arrangement for controlling the windows which overcomes the above stated problems. In particular, the present disclosure aims to provide an arrangement and a method which allow using a single kind of hardware switch unit which is the same for the driver's door as for the passenger's doors. This may thus solve problems related to cost since a multitude of different details is no longer needed. Also, the need for wiring looms and switch complexity may be reduced while less complex and costly door panels can be enabled.

The above-mentioned object is achieved by a window control arrangement according to subsequent claim 1, which discloses a control arrangement for operating two or more windows in a vehicle, said window control arrangement comprising one or several manually operated window control switches being set as default to be associated with a specific one of said windows; a window actuator associated with each of said windows and being configured for raising or lowering a corresponding window; a control unit connected to said window actuators for controlling raising or lowering of said windows; and an input device connected to the control unit, said input device having a multitude of input modes of which at least one mode is configured for receiving input concerning operation of said windows. Furthermore, the arrangement is configured for activating said input device to be in said at least one mode configured for receiving input concerning operation of said windows as a result of a detected intention from a driver or passenger in said vehicle to activate a window actuator.

According to an embodiment, the manually operated window control switches can be for example in the form of a control lever, a push button or the like, which is dedicated to controlling a window. These window control switches are arranged such that each one is associated with a specific one of the windows, i.e. each one of these window control switches is associated with a different window and, thus, each control switch is allocated so as to control different windows in a default mode. In a typical case for a car, the arrangement comprises four windows which may be controlled to be raised or lowered, and mounted in the front and rear doors at each side of the vehicle. In general, there are window control switches provided for each one of these windows in close vicinity to the windows, e.g. in each door panel.

In vehicles today, there is in general further window control buttons comprised in the door panel of the driver's door for controlling all openable windows. However, the system is also functional when there are for example only two windows included, e.g. one window for each front door, or when further windows are included.

In order to be able to operate the windows there is a window actuator associated with each of the controllable windows and forming part of the window control arrangement. The window actuators are configured for raising or lowering a corresponding window and may thus be activated by the use of the window control switches.

The arrangement further includes a control unit which is connected to the above-mentioned window actuators. The control unit is configured to receive input from control devices and to be used for outputting control commands for controlling the raising and lowering of the windows. The control unit is thus used for receiving commands related to the operation of said windows, e.g. from one or several of the above mentioned window control switches or an input device which will be explained more in detail below.

The system is also provided with an input device, e.g. a touch screen, which is connected to the control unit. The input device is designed to have a multitude of input modes and is configured for receiving input concerning operation of said windows, i.e. the input device is programmed with a at least one mode being configured for receiving input concerning operation of the windows. The input device may for example be used for selecting the functionality of a control switch, e.g. to select which window or windows that should be controlled by the selected switch or be used for directly input lowering or raising instructions for one or several windows selected from the input device.

The input device is for example a touch screen, even though other constructional designs are possible, e.g. a keyboard or control panel with a display.

The window control arrangement is designed and configured for activating the input device in a mode which is configured for receiving input concerning operation of said windows as a result of a detected intention from a driver or passenger in the vehicle to activate a window actuator, i.e. to raise or lower a window. Hence, the window control arrangement is provided with the feature of recognizing and reacting to certain motions of a driver or passenger in order to decide if there is an intention to perform a window operation. When such an activity is recognized, the input device is set in a mode configured for receiving input concerning operation of the windows and relevant information related to the input device may be displayed automatically.

The intention to perform a window operation, e.g. to activate a window actuator, may be detected in various ways and will be discussed in greater detail below.

The general idea is that the system will be able to detect an intention to reach for, or be in contact with, one of the window control switches. The benefit of having a system which activates an input device is that there is no longer a need for having several window control switches, or a hardware multifunctional window control switch, within reach for a driver. An advantage of this idea is to remove all additional window control switches in all car doors and place all door switch operations in the input device, with the exception of one window switch for each door. In many countries, there is a legal minimum of having at least one window switch for each door and window. The driver's door could thus appear to be the same, i.e. have the same kind of window control buttons, as all the other doors, i.e. one window switch having the same size, same shape and same basic function. This will reduce variant costs, wiring loom cost and weight and the need for the commonly used window control switch pack in a driver's door. In this manner, weight and cost, specific tooling instruments and the required space in the door panel can be reduced.

Through this solution, the functionality of an already present input device, e.g. a touch screen or key pad with an associated display, is changed or operated so as to control of the windows. In case the mode of the input device was changed due to the detection of an intention to reach for or be in contact with a selected window control switch, the input device may for example request to choose the functionality for the selected window control switch, e.g. to choose which window or windows that should be controlled by the selected switch. Hence, the selected window control switch, i.e. the window control switch which triggered the functionality for the input device to be set in window control mode, could thus be defined to change its function from controlling the associated window to controlling any desired window (or windows) connected to the system according to input information on the input device.

In another control arrangement, the input device could be set in a mode in which the input device is used for a direct input of instructions for lowering or raising one or several windows while the selected switch maintains its preset function to raise or lower its associated window. According to this alternative, the window control switch may be continuously used for control of the associated window but the input device is set so as to be able to control the other windows in an easy manner.

Hence, the arrangement according to the disclosure enables the use of only one window switch in each door for direct access to the function of raising and lowering the window associated with the very same door while also providing for a possibility to access control of further windows in an easy manner.

In order to allow such a single window control switch to provide a multi-function, the function of the window control switch may be selected from the input device, e.g. a touch screen. The touch screen will be activated in response to an indication that a person in the car, e.g. the driver, has the intention to activate a window actuator for lowering or raising a vehicle window. This intention is for example detected by sensing a movement in close vicinity to a selected window control switch or by touching or manipulating the selected window control switch.

When the screen is activated, it may be used to select which window or windows the selected window control switch shall control in order to be lowered or raised. For example, it may be a choice to select all windows to be controlled by the very same switch to assure that all windows are closed by using the selected window control. Hence, the system may comprise a proximity sensor arranged in close vicinity of a corresponding window control switch. The proximity sensor is connected to the control unit and is used to indicate, when activated, an intention to activate a window actuator. If proximity sensors are used, there is in general at least one sensor present in the vicinity of the window control switch closest to the driver. There may also be further proximity sensors if desired, e.g. at least for the window control switch close to the front passenger seat. The proximity sensor shall preferably be arranged in a position in which it can be expected that a vehicle driver or passenger will position a hand during actuation of the window control switch. In addition, this location should be selected such that there is no or low risk for sensing a hand, or any other obstacle, when there is no desire for reaching out for the window control switch.

According to another example, a touch screen may be changed if the window control switch in the door is touched or 'sensed', which indicates a desire to perform a window control, and then the center screen could expand so as to define a view of a switch pack presented visually on the screen and all windows could be controlled therefrom. In such an arrangement, it would be easy to adapt or renew a layout of the switch pack by only implementing a new software and thus change the appearance and controllability. The present arrangement thus implies a reduced switch complexity and variant costs in production as well as allowing updates of the system at a cheaper cost since modifications will include less hardware modifications of parts.

For any of the above exemplified arrangements, the intention from a driver or passenger to activate a window actuator could be detected by sensing that there is a manipulation of a corresponding window control switch instead of using proximity sensors. By manipulation is meant touching or starting to use a window control switch for lowering or raising a window.

The window control switches may for example be located in a corresponding door panel of each door provided with a controllable window.

The window control switches may be set to have a default function to control the window associated with each window control switch, e.g. if a control switch is provided in a vehicle door panel, the window control switch is set, as default, to control the window of the very same door.

The input device may be a touch screen. The touch screen could for example be designed to illustrate a view of a switch pack for control of all windows when it is detected that there is an intention from a driver to activate an window actuator. In this case, there may thus be a possibility to control raising and lowering of each window individually from the touch screen.

The input device may be located at a position within reach from both a driver's and passenger's seat, e.g. on the front panel between the seats or in the space right between the seat cushions in the front compartment of the vehicle.

The input device may also function for selecting which windows that shall be controlled from the input device or an window control switch. Depending on how the window control arrangement is intended to work and how the intention to activate a window actuator is detected, the arrangement may be configured differently. For example, if a proximity sensor is used for detecting the intention to activate the window actuator and the proximity sensor sends a signal to the input unit to be used for controlling all windows, there is no actual need for connecting the individual window control switches to the central control unit if not desired for other purposes. Hence, each window control switch could have the same functionality always and need not be connected to the central control unit since the function of lowering and raising windows is controlled from the input device.

However, the proximity sensor needs to be connected to the control unit in this case in order to provide input for changing the function of the input device.

In another example, the touching or manipulation of a window control switch is used as an intention to activate the window actuator. In this case, the selected window control switch should be connected to the central unit in order to provide an input of the detected intention. If a switch is connected to the control unit, it may be used for controlling the window actuators connected to the control unit and the window (or windows) to be controlled may be selected from the input device. It should be noted that the window control switches may be connected and used in the very same way also when there is a proximity sensor present in the arrangement but it is not necessary in this case.

The disclosure further relates to a method for controlling the operation of two or more windows in a vehicle. The method comprises a step of detecting an intention from a driver or passenger in a vehicle to activate a window actuator. Different ways of doing this have been described above and the method may comprise any suitable way of detecting a desire from a driver or passenger to raise or lower a window of the vehicle.

The method further comprises the features of sending a control signal to an input device that there is an intention from a driver or passenger in the vehicle to activate a window actuator. Thereafter the arrangement is controlled for setting the input device, having a multitude of input modes, in a mode being configured for receiving input concerning operation of said windows in response to said control signal indicating that there is an intention to activate a window actuator.

Hence, when the input device has been set in a mode for receiving information the procedure continues with manually entering information into the input device.

Finally, the method comprises the step of transmitting the information entered into the input device to a control unit connected to said window actuators in order to influence the control of the window actuators.

According to the method described above, the information, which is transmitted from the input device to the control unit, may comprise control signals for one or several of said window actuators for raising or lowering said windows. Hence, the lowering and raising may be controlled directly from the input device.

The input device may also be programmed such that the information transmitted from the input device to the control unit comprises control signals for redefining the function of a window control switch. The window control switch may thus be redefined from a default function, e.g. only controlling an associated window actuator, to control one or several other window actuators for raising or lowering selected windows. The input device may of course be designed to provide both possibilities, i.e. to both select which windows to be controlled by a specific window control switch or using the input device for direct control of one or several windows.

The method may further comprise the feature of detecting a motion or a presence of an object, e.g. a hand, in the vicinity of a window control switch for detecting there is an intention from a driver or passenger in the vehicle to activate a window actuator. This may for example be achieved by the use of a proximity sensor arranged in or close to a corresponding window control switch.

According to the method described above, the function, or display, of a multi-input device is changed automatically. The function of the input device may be maintained in this window control entering mode for a predetermined time and/or until it is indicated that another function is desired for the input device.

The disclosure can be applied in different types of vehicles, such as cars, trucks and buses. For example, having the same hardware switch control in every door should reduce the number of variants considerably for an ordinary car and provide a possibility to reduce the size, weight, cost and complexity of each car. It will also be possible to offer the passenger and driver the access to all door controls rather than just the driver. The input device could also offer other functions with one touch or click such as "all windows down" or "close all windows". It could also be added that other types of openings, e.g. a hatch for a sunroof, may be controlled by the very same window control switch. This system could thus dramatically reduce the driver's interface where the driver has to operate each switch one by one by interfacing with cumbersome mechanical parts.

Another advantage would be obtained if there is a desire to re-design and manufacture new window control operating systems if the "switch packs" are implemented as software instead of hardware. Hence, the disclosure may easily be implemented in any car with a center input device, e.g. center touch screen or control panel with display.

Further advantages and advantageous features of the disclosure are disclosed in the following description and in the dependent claims.

BRIEF DESCRIPTION OF THE DRAWINGS

Further features of the present disclosure will appear from the following detailed description, wherein the disclosure will be described in more detail with reference to the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Different embodiments of the present disclosure will be described with reference to the accompanying drawings. The arrangements described below can be realized in many different forms and should not be construed as being limited to the embodiments described below.

Figure 1:
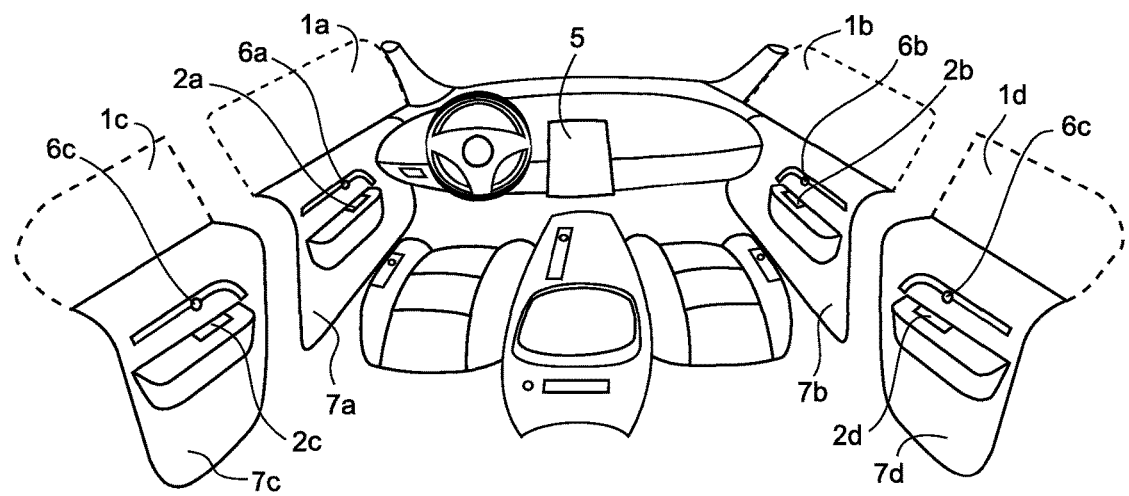
FIG. 1 shows an arrangement for operating a set of vehicle windows.

With initial reference to FIG. 1, there is shown a simplified view of the interior of vehicle compartment. For the sake of simplicity, only those features which are considered to be relevant for describing the present disclosure are numbered, and other features have been displayed in the figure in order to understand the present concept.

In the vehicle compartment, there is shown four windows 1a-d which form part of a respective door 7a-d, i.e. front and rear doors at the left and right side of the vehicle. Each one of the windows 1a-d is openable and has an associated window control switch 2a-d located in a panel of a respective door 7a-d. Furthermore, proximity sensors 6a-d are located in the vicinity of a respective window control switch 2a-d. The vehicle is furthermore provided with an input device 5 located on the front panel between the front seats. The input device 5 is here exemplified as a multifunctional touch screen for displaying information and receiving input control commands from a user.

As disclosed in FIG. 1, there is a proximity sensor 6a-d located in the vicinity of all window control switches 2a-d. Each proximity sensor 6a-d is used for detecting a movement or obstacle in the vicinity of the associated control switch 2a-d as an intention or attempt to activate a window actuator 4a-d and raising or lowering a window 1a-d.

Normally, the multi-control function for opening and closing of windows is restricted to be accessed from the driver's seat, or in some cases, from the front passenger's seat as well. Hence, a vehicle provided with only the front seat proximity sensors 2a, 2b is an option which is relevant for most cases related to a car. Enabling a functionality of automatically sensing the intention to control a window from the passenger seat and supporting a multi-control of raising and lowering windows from the passenger seat will also have the benefit of not needing to provide different hardware set ups for right steered and left steered vehicles, respectively. In this case, there is only one additional proximity sensor needed to make both sides look equal and the same kind of simplistic window switch control may be used for each window 1a-d.

Figure 2:
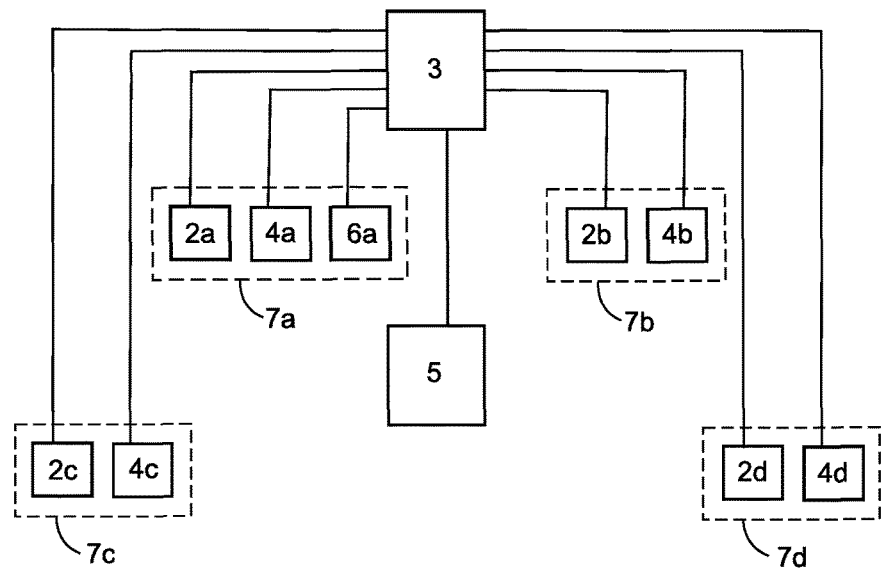
FIG. 2 shows in a schematical manner an arrangement for operating a set of windows in a vehicle.

FIG. 2 discloses in a schematical manner a system for operating a set of windows 1a-d in a vehicle. The vehicle doors 7a-d are provided with a respective set of window actuators 4a-d and window control switches 2a-d. In addition, one vehicle door 7a, representing the front door on the driver's side, is provided with a proximity sensor 6a. Hence, this system is only intended for using the automatic multi-control function for the windows 1a-d from the driver's seat. According to further embodiments, proximity sensors can also be arranged in one or more of the remaining doors in a similar manner as indicated in FIG. 1.

It can further be seen in FIG. 2 that each window actuator 4a-d, each window control switch 2a-d and the single proximity sensor 6a are connected to a control unit 3. The control unit is further connected to the input device 5, having a multi-input function and being able to be switched between different input modes. Hence, the control unit 3 may be configured to receive input control commands from the window control switches 2a-d, the proximity sensor 6a and the input device 5. The control unit 3 is further designed to send output control commands to the window actuators 4a-d, for raising and lowering the windows 1a-d, and also to send control signals to the input device 5, e.g. to select mode and change display options.

The control unit 2, input device 5 and/or any other units or devices described herein may comprise one or more processors (e.g., microprocessors, microcontrollers, programmable digital signal processors, or other programmable devices). Such units or devices may also, or instead, include an application specific integrated circuit (ASIC), a programmable gate array or programmable array logic, a programmable logic device, or a digital signal processor (DSP). Where a unit or device includes a programmable device such as a microprocessor, microcontroller or programmable digital signal processor, it may further include a memory or storage for storing computer executable instructions (e.g., code) that are executable by the programmable unit device for controlling operation of the programmable device and for performing the particular algorithms represented by the functions and/or operations described herein.

Hence, with reference to FIGS. 1 and 2, the system may function as follows:

A movement of a person is sensed by the proximity sensor 6a in the vicinity of the of the window control switch 2a, i.e. the window control switch 2a in the driver's door 7a. In response to this sensed condition which is interpreted as an intention to control a window operation, the multifunctional input device 5, i.e. the touch screen, is set to be in a window control mode. The setting of the touch screen 5 in the window control mode may be accompanied by some kind of alert, e.g. a lit up or flashing screen, a sound originating from the location of the screen 5 or a voice message telling the multi-input screen 5 is set in a window control mode. When the screen 5 is in this mode, there may be a multitude of different options. For example, the screen may comprise a control of each individual window while the function of all the control switches 2a-d maintains their default function. In this case, there is no need for connecting the window control switches 2a-d to the central control unit 3 (as disclosed in FIG. 2) but the control switches 2a-d may be isolated systems connected to its respective window actuator 4a-d.

The screen 5 could also have the feature of "raise all" or "lower all" which provides for simultaneous raising or lowering of all windows, respectively. Furthermore, the screen 5 may be designed to allow a selection of desired windows 1a-1d which shall be the subject for control actions from the screen, i.e. lowering or raising of the windows.

Another way of using the screen 5 for window control is for purely selecting which windows 7a-d that shall be operated, e.g. selecting one or several of the windows in the window control arrangement which shall be raised or lowered by using the selected window control switch 2a, i.e. the switch close to the proximity sensor 6a which detected a movement in the vicinity of the control switch 2a.

The above described embodiments only serve as examples of how the disclosure may be performed. Hence, in still another version may for example the proximity sensors be left out and touch or manipulation sensitive systems may be used which recognizes the use or touching of a window control switch 2a-d as an intention to activate an window actuator 4a-d and raising or lowering a window 1a-d. In this case all window control switches 2a-d may be designed in the same way with no need for modifications and an even more simple and uniform hardware configuration may be used than when proximity sensors are present.

The system may also comprise further input devices connected to the control unit, e.g. a centrally located input device located between the back rests of the front seats and intended to be used for input control signals from the back seat.

It is to be understood that the present disclosure is not limited to the embodiments described above and illustrated in the drawings. The skilled person will recognize that changes and modifications may be made within the scope of the appended claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A window control arrangement for operating two or more windows in a vehicle, the window control arrangement comprising:
    several manually operated window control switches set as default to be associated with a specific one of the windows;
    a window actuator to be associated with each of the windows and configured for raising or lowering a corresponding window;
    a control unit connectable to the window actuators for controlling raising or lowering of the windows; and
    an input device connectable to the control unit, the input device having a display and a plurality of input modes of which at least one mode is configured for receiving input concerning operation of the windows, the input received concerning operation of the windows comprising information manually entered using the display;
    wherein the window control arrangement is configured for activating the input device to be in the at least one mode configured for receiving input concerning operation of the windows as a result of a detected intention from a driver or passenger in the vehicle to activate one of the window actuators;
    wherein the information transmitted from the input device to the control unit comprises control signals for redefining the function of one of the several manually operated window control switches from only controlling an associated window to control at least one other window actuator raising or lowering the windows.

2. The window control arrangement of claim 1 further comprising a proximity sensor to be arranged in close vicinity of a corresponding window control switch, the proximity sensor connectable to the control unit and used to indicate, when activated, an intention from a driver or passenger in the vehicle to activate the window actuator.

3. The window control arrangement of claim 2 wherein the proximity sensor is arrangeable in a position at which it can be expected that a vehicle driver or passenger can be expected to position a hand during actuation of the corresponding window control switch.

4. The window control arrangement of claim 1 wherein manipulation of a corresponding window control switch is used to indicate an intention from a driver or passenger to activate the window actuator.

5. The window control arrangement of claim 1 wherein each of the window control switches is mountable in a corresponding vehicle door panel.

6. The window control arrangement of claim 1 wherein each of the window control switches is set to default control the window associated with each window control switch.

7. The window control arrangement of claim 1 wherein the input device comprises a touch screen.

8. The window control arrangement of claim 7 wherein the touch screen is designed to expand a view of switch pack for control of all windows when an intention is detected from a driver or passenger in the vehicle to activate the window actuator.

9. The window control arrangement of claim 1 wherein the input device is locatable at a position within reach from both the driver's seat and the passenger's seat.

10. A method for controlling operation of two or more windows in a vehicle, the method comprising:
    detecting an intention from a driver or passenger in a vehicle to activate a window actuator;
    sending to an input device having a display a control signal via a control unit connecting the input device and the window actuator, which signal indicates that there is an intention from the driver or passenger to activate the window actuator;
    setting the input device, having a plurality of input modes, in a mode configured for receiving input concerning operation of the windows in response to the control signal indicating that there is an intention to activate the window actuator;
    receiving manually entered information in the input device using the display; and
    transmitting the information entered into the input device to the control unit in order to influence control of the window actuators;
    wherein the information transmitted from the input device to the control unit comprises control signals for redefining the function of a window control switch from only controlling an associated window to control at least one other window actuator for raising or lowering the windows.

11. The method according to claim 10 wherein the information transmitted from the input device to the control unit comprises control signals for the at least one other window actuator for raising or lowering the windows.

12. The method of claim 10 wherein detecting an intention from a driver or passenger in the vehicle to activate the window actuator is made by detecting a motion or a presence of an object in the vicinity of a window control switch.

13. The method of claim 12 wherein the object comprises a hand.

14. The method of claim 12 wherein a motion or a presence of an object in the vicinity of the window control switch is detected by a proximity sensor arranged in or close to the window control switch.

15. A window control arrangement for operating two or more windows in a vehicle, the window control arrangement comprising:
  a control unit connectable to a plurality of window actuators for controlling raising or lowering of the windows, each window actuator to be associated with one of the windows and configured for raising or lowering the corresponding window; and
  an input device connectable to the control unit, the input device having a display and a plurality of input modes of which at least one mode is configured for receiving input concerning operation of the windows, the input received concerning operation of the windows comprising information manually entered using the display;
  wherein the window control arrangement is configured for activating the input device to be in the at least one mode configured for receiving input concerning operation of the windows as a result of a detected intention from a driver or passenger in the vehicle to activate one of the window actuators;
  wherein the information transmitted from the input device to the control unit comprises control signals for redefining the function of a window control switch from only controlling an associated window to control at least one other window actuator for raising or lowering the windows.

16. The window control arrangement of claim 15 further comprising a proximity sensor to be arranged in close vicinity of the window control switch, the proximity sensor connectable to the control unit and used to indicate, when activated, an intention from a driver or passenger in the vehicle to activate one of the plurality of window actuators.

17. The window control arrangement of claim 15 wherein manipulation of the window control switch is used to indicate an intention from a driver or passenger to activate one of the plurality of window actuators.

18. The window control arrangement of claim 15 wherein the input device comprises a touch screen.

19. The window control arrangement of claim 18 wherein the touch screen is designed to expand a view of switch pack for control of all windows when an intention is detected from a driver or passenger in the vehicle to activate one of the plurality of window actuators.

* * * * *